Sept. 7, 1943.   J. L. BETZEN   2,328,775
ROTARY INTERNAL COMBUSTION ENGINE
Filed Sept. 4, 1942   3 Sheets-Sheet 1
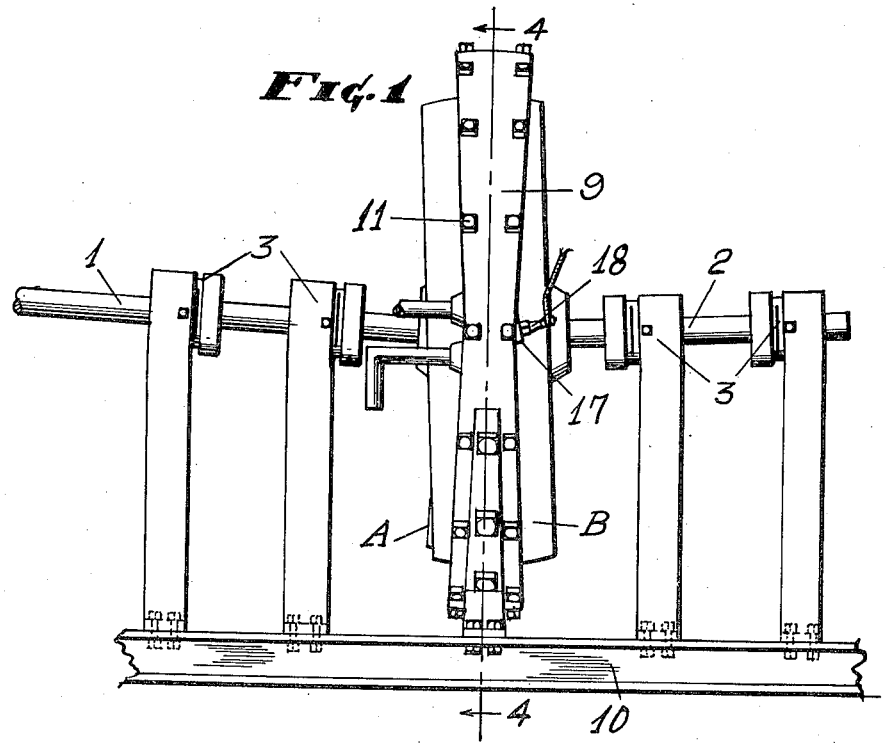
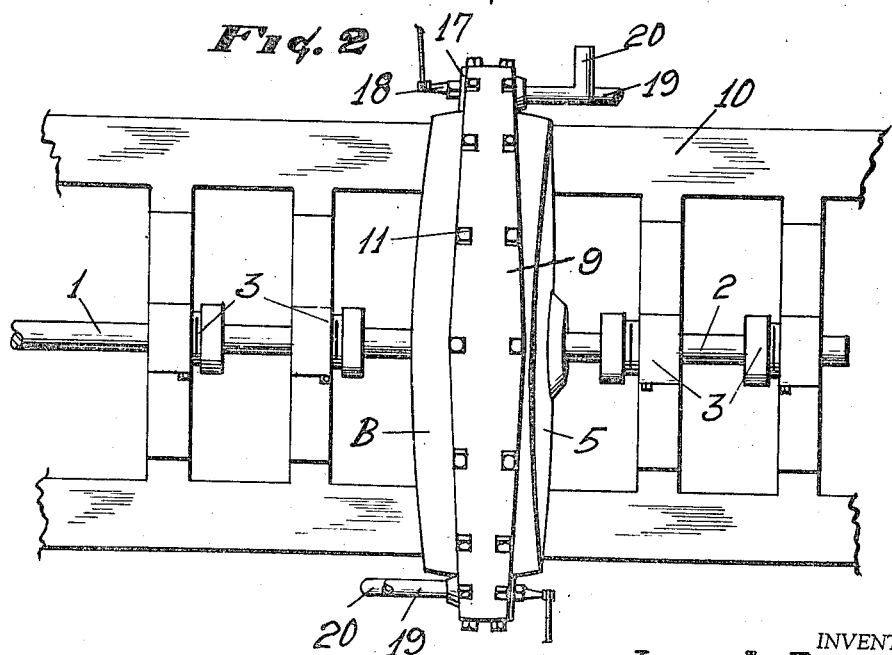
INVENTOR.
JOHN L. BETZEN.
BY Sept. 7, 1943.    J. L. BETZEN    2,328,775
ROTARY INTERNAL COMBUSTION ENGINE
Filed Sept. 4, 1942    3 Sheets-Sheet 2
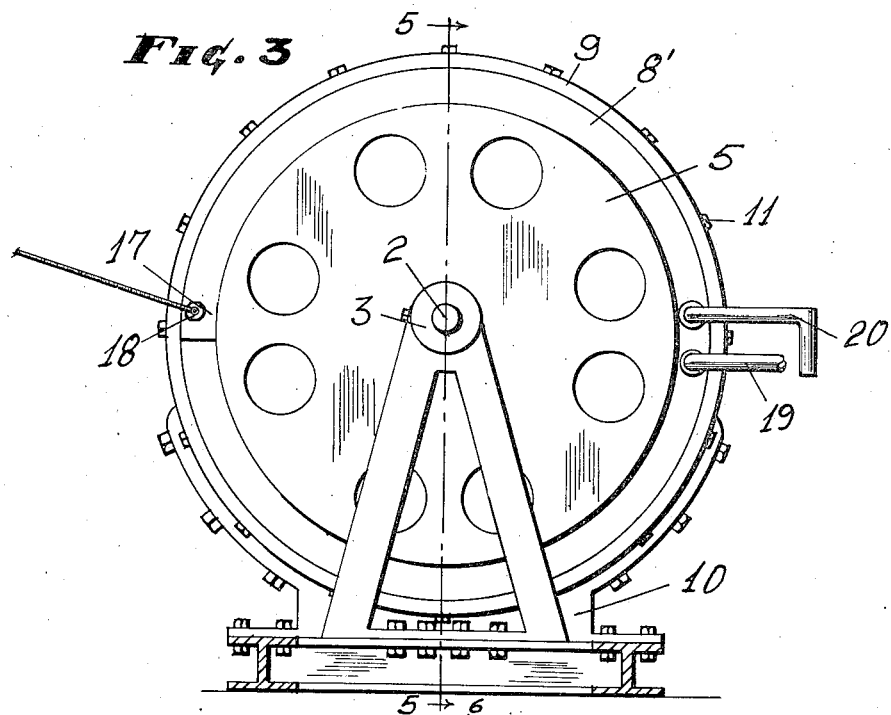
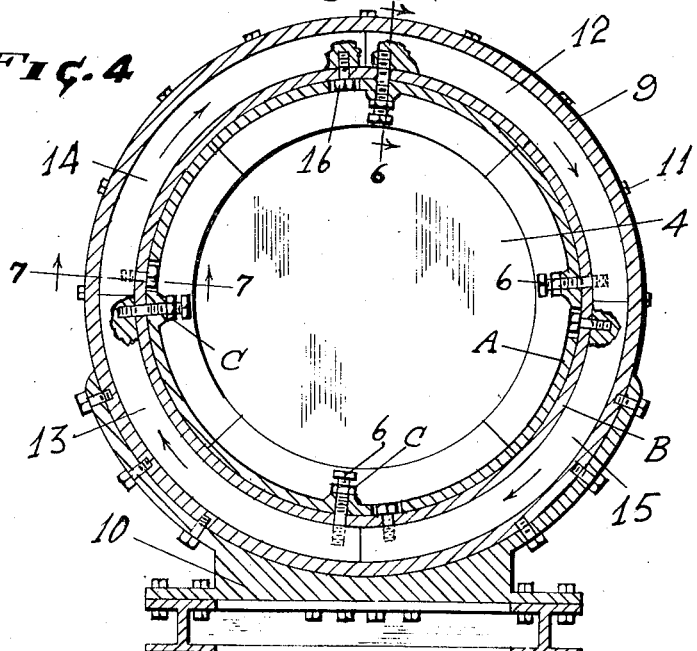
INVENTOR.
JOHN L. BETZEN.
BY U. S. Charles
Atty Sept. 7, 1943.　　　　J. L. BETZEN　　　　2,328,775
ROTARY INTERNAL COMBUSTION ENGINE
Filed Sept. 4, 1942　　　3 Sheets-Sheet 3
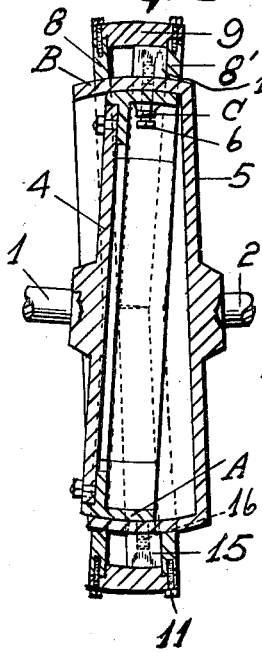
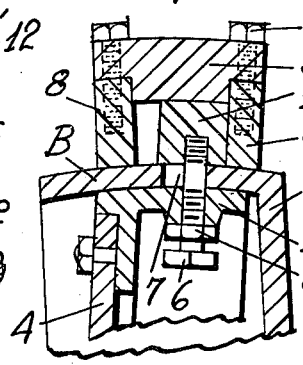
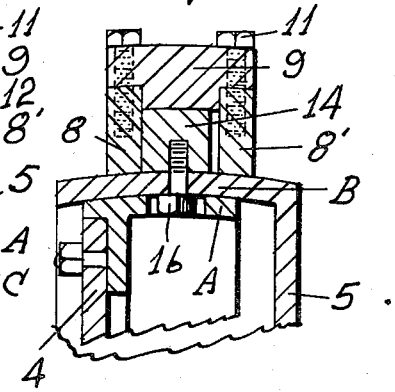
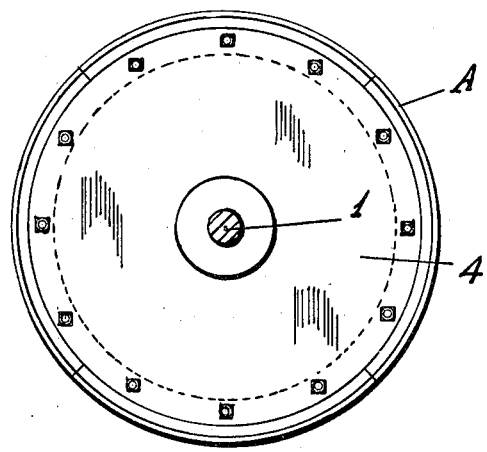
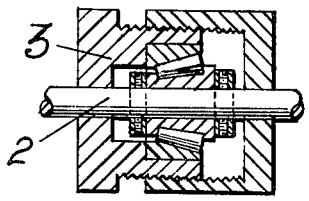
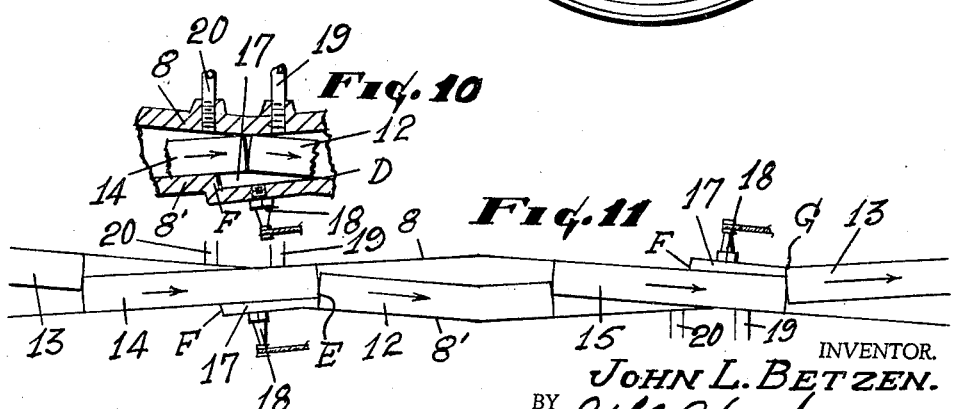
INVENTOR.
JOHN L. BETZEN.
BY E. S. Charles
Atty Patented Sept. 7, 1943

2,328,775

UNITED STATES PATENT OFFICE 2,328,775

ROTARY INTERNAL COMBUSTION ENGINE

John L. Betzen, Wichita, Kans.

Application September 4, 1942, Serial No. 457,298

4 Claims. (Cl. 123—8)

This invention relates to a rotary internal combustion engine, and has for its principal object the arrangement of a pair of combustion chambers oppositely disposed on the diametrical axis of an annular cylinder, whereby, when combustion occurs, side thrust on the shaft bearing is avoided.

A further object of this invention is to constuct an annular cylinder that varies in width circumferentially, the variation ranging from quadrant to quadrant; in other words, the said cylinder is narrow at one point and diverging to the other point, running through an arc of ninety degrees and from thence converging to the next point and so on alternately around the cylinder circumferentially, the cylinder being substantially rectangular in cross section and having arcuate pistons likewise substantially rectangular in cross section, the rectangular form being to provide ample area at the heads of the pistons to receive the impact of fuel explosion, the compression being actuated along the side of the pistons and communicating with a combustion chamber at the side of the cylinder.

A still further object of this invention is to construct an engine in such a way that the power imparted thereby is chiefly computed on its diameter.

A still further object of this invention is to construct an internal combustion engine in such a way as to eliminate reciprocating movements of any part thereof, and furthermore an engine that is smooth running and practically noiseless.

These and other objects will hereinafter be more fully explained, reference being had to the accompanying drawings, forming a part of this specification, and in which like characters will apply to like parts in the different views.

Referring to the drawings:

Fig. 1 is an elevation of the engine.

Fig. 2 is a plan view of Fig. 1.

Fig. 3 is a transverse view to that of Fig. 1.

Fig. 4 is a sectional view taken on line 4—4 in Fig. 1.

Fig. 5 is a sectional view taken on line 5—5 in Fig. 3.

Fig. 6 is an enlarged cross section through the cylinder taken on line 6—6 in Fig. 4.

Fig. 7 is an enlarged sectional view taken on line 7—7 in Fig. 4.

Fig. 8 is an outside view of one of the discs.

Fig. 9 is a sectional view through one of the journal bearings.

Fig. 10 is a sectional view through one of the combustion chambers, illustrating a relative position of the pistons prior to moment of firing.

Fig. 11 is an unwound plan view of the cylinder and pistons diagrammatically shown by single lines for convenience of illustration to show the relative movements of the pistons.

The component parts of the rotary engine herein disclosed consist of a pair of shafts 1 and 2, respectively, said shafts having suitable bearings 3, and the said shafts each slants upward from its respective side of the engine body. Shaft 1 is secured to a disc head 4 that has a peripheral flange A while shaft 2 is rigidly secured to another disc head 5 that likewise has a peripheral flange B, the latter overlapping the flange of the first said disc head, and being secured rockably together through the medium of studs 6 spaced therearound and threadedly engaging through the inner flange A as shown in Fig. 6, each stud extending through a slot 7 transversely positioned in the outer flange B whereby said flanges will slidably engage in a rocking movement as the heads rotate. Furthermore the outer end portion of each stud where it leaves the flanges is threaded to engage its respective piston later described. Being thus assembled, the stud is secured by a lock nut C abutting the inside flange A. It will now be seen from the illustration shown in Fig. 6 that the pistons are carried by the studs from one side to the other of the cylinder as the disc heads rotate.

Peripherally positioned on the outer flange B of disc head 5, is an annular cylinder comprised of side walls 8 and 8' in which said flange will rotatably engage while the outer wall 9 of the cylinder is secured to a base 10 as stationary supporting means for the cylinder, except its inner wall that is formed by the flange B, the said outer wall being secured to the side walls by a plurality of cap screws 11 spaced therearound.

It will now be seen that the said pistons as heretofore stated are carried in rotation with the flanges of the disc heads, which in turn will rotate the said shafts. In Fig. 4 is shown the assembly of the pistons, there being four in number. Pistons 12 and 13 are carried by the inner flange A of the disc head 4 and are secured thereto by the aforesaid studs 6, while pistons 14 and 15 are carried by the outer flange of disc head 5 and secured thereto by cap screws 16, it being understood that the abutting ends of the pistons are adapted to slidably engage as controlled by the rocking movement of their respective disc heads heretofore described for the purpose later described.

The cylinder above referred to varies in its width to accommodate for lateral sliding movements of the pistons whereby compression and vacuum are arranged for the fuel conduction. In Fig. 10 is shown a combustion chamber 17 formed in the side wall 8' and oppositely disposed on the diametrical axis as shown in Fig. 2. In said view prior to the point of firing is shown the abutting ends of two of the pistons at which instance the piston ends are in registry, and in their movement as disclosed by the arrow, the end of the leading piston 12 will follow its side wall 8' as at D while the following piston head will follow side wall 8, the movement control of which is as heretofore described and the said pistons being so conducted their abutting ends will move sideways oppositely as shown at E in Fig. 11, at which instant the head of one piston and head, as at F, of the combustion chamber will define the length of said chamber at the moment of combustion. It will now be seen that the force of explosion will drive all of said pistons in one direction, and furthermore a similar combustion chamber is oppositely disposed diametrically and each adapted to ignite simultaneously through the medium of their respective spark plugs 18 communicating with the chambers, whereby side thrust on the shafts is obviated and a greater power obtained to move the pistons which in turn carry their respective disc heads to which the said shafts are axially secured.

Inasmuch as the pistons will wabble from side to side of the cylinder as they circumscribe the same, the manner by which fuel is injected into the engine will be for example as follows: When the abutting ends of pistons 12 and 15 are at the intake 19, the injection of fuel starts and continues to fill the space between the piston 12 and the cylinder wall 8 opposite thereto, until cut off by the approaching end of piston 14, the fuel thus injected being carried forward until the leading end of piston 12 moves into contact with the wall as at G which stops the forward movement of the fuel. At this moment the approaching end of piston 14 will function as a compressor for the fuel as last said piston engages snugly with the cylinder walls on its path to the combustion chamber where the fuel is ignited when the abutting ends of pistons 12 and 14 have passed the said combustion chamber, at which instance the fuel has been compressed for ignition and adapted to impound its force on the end F of the combustion chamber and the end of piston 13 as it moves from registry with the following piston 14 and so on as the said pistons move from chamber to chamber, however the side movement being opposite alternately from chamber to chamber during rotation of the piston and heads 4 and 5 therefor.

There is also provided an exhaust 20 for each compression chamber when the fuel supply port is closed as shown in Fig. 11.

Such other modifications may be made as lie within the scope of the appended claims.

Having fully described my invention what I claim as new and desire to secure by Letters Patent is:

1. In a rotary internal combustion engine, an annular cylinder comprised of two side walls and an outer peripheral wall, and a base to which said cylinder elements are secured as stationary supporting means therefor, a disc having an annular flange at its outer periphery, the flange closing the inside wall of the cylinder and rotatable therein, a plurality of sector pistons for the cylinder, said pistons spaced apart and being secured to the flange, another disc having a peripheral flange to engage within the flange of the first said disc, and a plurality of sector pistons secured to last said flange and spaced apart in interposition with the first said pistons, said pistons being the turning means for the said discs simultaneously, each disc having a shaft rigidly secured thereto as power transmitting means as the discs are turned, said discs each slanting oppositely from a vertical plane so that their respective pistons will cross on a diametrical axis sufficient to maintain end registry at said axis and being partially moved from registry as the pistons rotate from said axis, whereby the impact of fuel combustion will engage a partially exposed end of the piston as they leave a combustion chamber, a combustion chamber positioned in the side walls of the cylinder adjacent the said diametrical axis, one chamber being in one side wall and the other in the opposite side wall of the cylinder, and a fuel supply for the chamber, and ignition means for the fuel.

2. In a rotary internal combustion engine of the class described, comprising a base supporting element and an annular cylinder secured to the base, said cylinder having two side walls and an outer peripheral wall secured to said side walls, said cylinder varying in width and being of a minor width on one diametrical axis and a major width on a diametrical axis transverse to the first said axis, a disc positioned at one side of the annular cylinder and slantingly positioned in parallelism with oppositely disposed sides of the cylinder wall with respect to a diametrical axis of the annular cylinder, and another disc oppositely slanting from the first said disc and being at the other side of the cylinder, the slant of last said disc being in parallelism with the other oppositely disposed sides of the cylinder with respect to the said diametrical axis, an annular flange integrally formed on one of said discs at its periphery, the flange closing the cylinder at its inner edges of its side walls and adapted to rotate with a smooth running fit where it closes the cylinder, an annular flange for the last said disc to engage within the first said flange, a plurality of pistons, a portion of which is secured to each flange in alternate relation and the abutting ends of the pistons to slide with a smooth running fit, said pistons to register longitudinally where they cross the minor width of the cylinder and to move partially from registry as they approach the major width whereby heads are formed at a combustion chamber to turn the pistons carrying the discs therewith, a plurality of combustion chambers formed in the side walls of the cylinder and a fuel feed and ignition plug for each chamber, there being provided in the side walls of the cylinder exhausts suitably arranged, and a shaft secured to one of said discs selectively as a power transmitter from the rotary engine.

3. In a rotary internal combustion engine, a pair of discs and shafts to journal the same in suitable bearings, each disc equally slanting in opposite direction from a vertical plane and being spaced apart and having an annular flange at the peripheral edges to extend toward each other, the flange of one disc seating rockably in the flange of the other disc, said other disc flange being transversely slotted at spaced intervals therearound, a pair of annular side walls seating on the outer surface of the outer flange to turn therein with a smooth running fit, said side walls converging inward, an annual member secured to the outer periphery of said side walls whereby an annular cylinder is formed and being substantially rectangular in cross section, said cylinder from a horizontal diametrical axis diverging upward and downward so that one side wall of the cylinder above and below the horizontal axis will be in parallelism and likewise the oppositely disposed walls of the cylinder, the side walls of the cylinder a spaced distance from its diametrical axis having a combustion chamber formed in the wall and a similar combustion chamber below the horizontal axis and oppositely disposed to the turning axis of the disc, said chambers to impound a force of explosion against the pistons for rotation in the same direction, a plurality of pistons spaced apart equal to their length and being secured rigidly to the slotted flange, and similar pistons spaced in like manner in interposition between the first said pistons, said last pistons being secured to the second said flange by bolts slidably engaging through the slots of said first flange by which means the pistons are laterally rocked in opposite directions as the discs turn but adapted to register where they pass through the horizontal diametrical axis of the cylinder, the pistons when rocked from registry functioning as a head at the leading side of their respective combustion chambers, means to inject fuel in said chambers and means to ignite the same simultaneously impounding the force of explosion on opposite sides of the turning axis of the discs to drive the pistons in the same direction, the interposition of the pistons being means to actuate equal turning of the disc, and shafts connected thereto, and a base supporting means to stationarily retain the annular cylinder.

4. In a rotary internal combustion engine, a series of pistons arcuate in form and adapted to circumscribe an arc from a common center and adapted to fit closely at their abutting ends, means to carry the sub-divisions equally divided, said means slidably positioned oppositely from a vertical plane and adapted to rotate simultaneously at the same rate of speed, a shaft axially secured to each said means, the shafts at their abutting ends between the means being connected universally for simultaneous rotation as power transmitters, an annual structure to function as a cylinder within which the pistons will move on their respective arcs, and the said cylinder having side walls diverging from a diametrical axis so that the pistons carried by their said means will alternately cross at the convergence of the cylinder whereby fuel is compressed on each side of the cylinder alternately, a suitable combustion chamber positioned in working relation to the convergence of the cylinder to receive the compressed fuel, and means to ignite the fuel to drive the pistons in one direction, and means to stationarily secure the annular cylinder against rotation.

JOHN L. BETZEN.